United States Patent [19]

McGrath, Jr.

[11] Patent Number: 4,907,923
[45] Date of Patent: Mar. 13, 1990

[54] CLOSET BOLT

[76] Inventor: Terence J. McGrath, Jr., R.D. 1, Box 100, Chester, N.Y. 10918

[21] Appl. No.: 236,595

[22] Filed: Aug. 25, 1988

[51] Int. Cl.$^4$ .................... F16B 27/00; F16B 39/00
[52] U.S. Cl. ...................... 411/107; 411/85; 411/399; 411/533; 411/544; 411/903; 411/908; 4/252 R
[58] Field of Search ............... 411/105, 107, 108, 109, 411/84, 85, 352, 353, 399, 417, 533, 544, 903, 908, 970; 4/252 R; 285/56, 58

[56] References Cited

U.S. PATENT DOCUMENTS

| | | | |
|---|---|---|---|
| 2,492,115 | 12/1949 | Crowther | 411/353 |
| 2,704,680 | 3/1955 | Bedford, Jr. | 411/970 |
| 2,993,950 | 7/1961 | Forman | 411/903 |
| 3,085,461 | 4/1963 | Forman | 411/903 |
| 3,419,298 | 12/1968 | Worley | 4/252 R |
| 3,846,851 | 11/1974 | Pepper | 411/84 |
| 3,905,052 | 9/1975 | DeAngelis | 285/56 |
| 4,530,629 | 7/1985 | Sakow | 411/533 |

Primary Examiner—Neill R. Wilson
Attorney, Agent, or Firm—Darby & Darby

[57] ABSTRACT

An improved closet bolt has a generally oval head, a shank including a threaded fastening portion extending from the head and generally concentric with respect thereto, and anti-turn ears or protrusions extending radially outwardly from a portion of the shank between the threaded shank portion and the head, the threaded portion adjacent the anti-turn ears having on opposite sides thereof a plurality of sawtooth or ramp members, the ramps sloping toward the bolt head, and wherein the bolt is constructed of a suitable high strength plastic material. Methods for using the improved closet bolt result in quick and efficient toilet installation, removal and repair.

11 Claims, 2 Drawing Sheets

U.S. Patent    Mar. 13, 1990    Sheet 1 of 2    4,907,923
FIG. 1
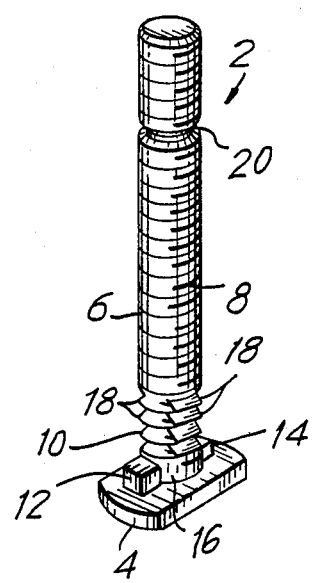
FIG. 2
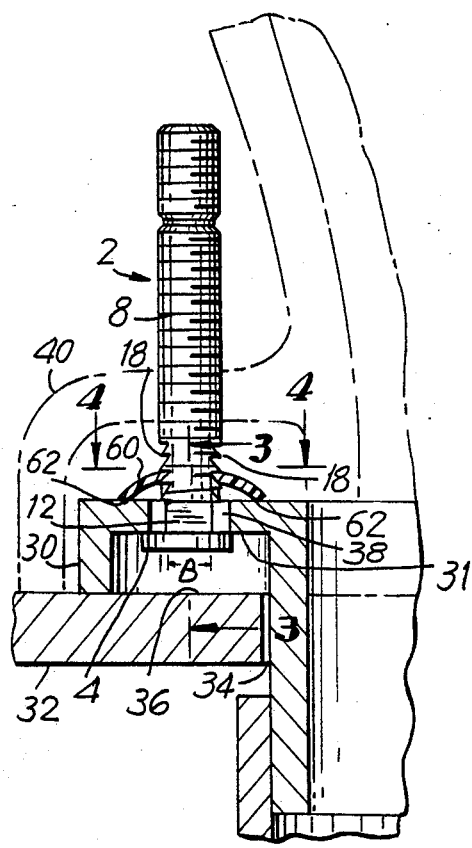
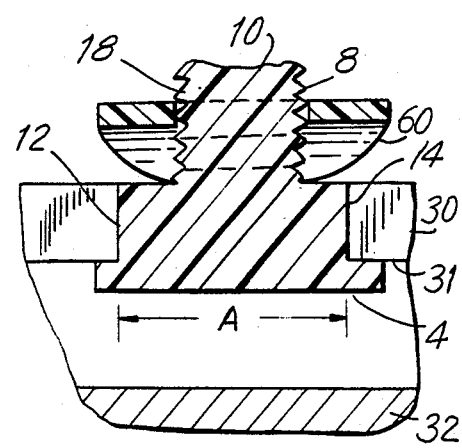
FIG. 3

CLOSET BOLT

BACKGROUND OF THE INVENTION a. Field of the Invention

The invention relates to hardware for use in installing and securing a toilet bowl to conventional plumbing couplings utilized in the housing industry, including the manufacture of mobile and prefabricated homes and the like. More specifically, the invention concerns an improved closet bolt structure for facilitating quick, efficient and reliable installation of toilet bowls. The invention also concerns methods for using the improved closet bolt.

b. Description of the Prior Art

The improved closet bolt of the present invention is an improvement over a prior art closet bolt in common use today, which is described in T. D. Flood, U.S. Pat. No. 3,339,215, for "Self-Retaining Closet Bolt." A prior art bolt such as that shown in U.S. Pat. No. 3,339,215 is marketed by Hercules Chemical Company, Inc. (New York, NY), under the registered trademark "JOHNI-BOLT."

A closet bolt is generally used to attach a plastic, vitreous or ceramic toilet bowl to the sewage outlet of a plumbing system via a conventional flanged coupling ring which is connected to the sewage piping. The flange is generally circular and has a diameter larger than the diameter of the plumbing hole provided in the floor on which the toilet will rest. The flange is provided with a series of two or more arcuate slots having one enlarged end adapted to receive the head of a closet bolt. The flange may also have straight slots extending inwardly from opposite outer edges of the flange for use in situations where positioning adjustments permitted by the arcuate slots are not necessary, such as in the mass production of mobile trailer homes, recreation camper vehicles, or apartment dwellings and the like.

The ceramic toilet bowl is provided with bolt-receiving holes in its base so that the threaded portion of closet bolt will project upwardly through the base of the toilet bowl.

A prior art closet bolt has a generally oval head, a threaded fastening portion generally concentric with respect thereto and a diametrically reduced, circumferentially smooth shank portion disposed between the head and the fastening portion of the bolt and concentric with respect thereto. The shank portion of the bolt includes a captive floating washer member enabling movement of the washer longitudinally on the shank portion so that the washer may be disposed above the customary toilet bowl flange coupling member or ring, where required, to retain the bolt head down disposed within either the arcuate or straight slot provided in the flange member. The entire disclosure of T. D. Flood, U.S. Pat. No. 3,339,215, for "Self-Retaining Closet Bolt," is expressly incorporated herein by reference.

In common practice, the '215 prior art closet bolt suffers from a number of disadvantages in ease of installation and ease of removal upon subsequent plumbing repairs as are commonly necessary. The usual procedure for installing a toilet bowl is to position the requisite number of closet bolts within either the arcuate slots or the straight slots of the mounting flange. The captive washer may first be moved upwardly along the shank portion before such placement of the bolt in the slot, however, so that the washer acts to restrain the bolt from dropping out of the slot in the case where the slot is not located over any flooring, but is instead over the opening in the floor. It is readily apparent to those skilled in the art that, while a plain threaded bolt may also be employed, such use is to be avoided because there is no structure provided for holding the ordinary bolt in a vertical position with the bolt head down.

Because the amount of vertical movement of the washer, determined by the length of the shank smooth portion, is designed to accommodate the thickest toilet mounting rings in use, the '215 closet bolt has been found to tilt over from true vertical when put in position to receive the toilet bowl. When two or more closet bolts so tilt over, the upper ends of the bolts may no longer be separated by the standardized distance between the holes in the base of the toilet bowl, thus making placement of the bowl on the bolts difficult. Workers installing toilets have often been forced to improvise various methods of keeping the closet bolts vertical, including having an assistant place his or her fingers under the descending ceramic bowl to locate and position the bolts in the bolt-receiving holes.

Furthermore, despite the provision of raised projections on the shank side of the bolt head, prior art closet bolts have been found to turn with the securing nut when the nut is tightened, thus failing to truly secure the toilet bowl to the floor. This problem is most troubling in the environment of mobile homes and the like, where the floor is subject to frequent, and often severe, shock and vibration.

In addition, because closet bolts have in the past been constructed of brass or steel or other metal, such bolts have been found to rust or otherwise corrode, due to frequent wetting by toilet water, cleaning solutions and urine, so as to make removal of the nut impossible without cutting the bolt. Due to the often cramped quarters in which the plumber must work, the ceramic toilet bowl may often be marred, chipped or otherwise damaged when the corroded closet bolt is cut with a bolt cutter or other similar tool.

It is apparent that an improved closet bolt eliminating the aforementioned drawbacks and difficulties would provide significant savings in time and expense of various plumbing operations, include installation and removal of toilet bowls.

SUMMARY OF THE INVENTION

It is a broad object of the invention to provide an improved closet bolt for facilitating attachment of a toilet bowl to a customary mounting flange.

An object of the invention is to provide a closet bolt which may be quickly, easily and securely fastened to the mounting flange prior to setting of the toilet bowl in place on the mounting flange.

Another object is to provide a closet bolt which, in use, remains in a vertical position after attachment to the flange but before placement of the toilet bowl on the flange.

Still another object of the invention is to provide a closet bolt which may be easily removed after years of service, despite frequent wetting by toilet water, cleaning solutions and urine.

Yet another object is to prevent rotation of the closet bolt with the tightening nut.

Another object of the invention is to provide an improved closet bolt which solves the aforementioned disadvantages of prior art closet bolts, yet which is easily and inexpensively manufactured.

These and other objects and advantages of the present invention are accomplished in a preferred embodiment of an improved closet bolt which comprises a bolt having a generally oval head, a shank including a threaded fastening portion extending from the head and generally concentric with respect thereto, at least one anti-turn ear or protrusion extending radially outwardly from a portion of the shank between the threaded shank portion and the head, the threaded portion adjacent the anti-turn ear having on opposite sides thereof a plurality of sawtooth or ramp members, the ramps sloping toward the bolt head, and wherein the bolt is constructed of a suitable high strength plastic material.

A novel preferred washer for use with the improved closet bolt comprises a thin, curved plastic washer having a central hole therethrough, the hole having opposed straight sides separated by a distance so as to permit the washer to resiliently and firmly snap over the sawtooth members on the bolt shank portion and downwardly into contact with the flange top side, thereby quickly and easily securing the bolt in a desired, fixed vertical position.

BRIEF DESCRIPTION OF THE DRAWINGS

The aforementioned brief description of the objects, advantages and features of the invention will be more readily understood after the following detailed description, taken in conjunction with the drawings in which:

FIG. 1 is a side elevational view of an improved closet bolt according to the principles of the invention;

FIG. 2 is a partial cross-sectional view of an improved closet bolt positioned in a mounting flange, with a toilet bowl to be installed thereon shown in phantom;

FIG. 3 is a partial cross-sectional view taken along the line 3—3 in FIG. 2;

DETAILED DESCRIPTION OF THE PREFERRED EMBODIMENTS

Figure 4:
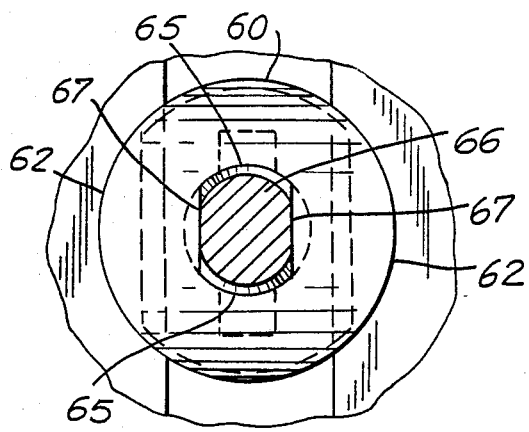
FIG. 4 is a partial cross-sectional view taken along the line 4—4 in FIG. 2.

As shown in FIG. 1, a closet bolt 2 according to the invention comprises a generally oval head 4, a shank 6 including a threaded fastening portion 8 generally concentric with respect to the head 4, and anti-turn ears or protrusions 12,14 extending radially outwardly from a portion 16 of the shank 6 between the threaded shank portion 8 and the head 4. A ramped portion 10 of the threaded portion 8 adjacent the anti-turn ears 12,14 has on opposite sides thereof a plurality of sawtooth or ramp members 18, the ramp members 18 sloping downwardly toward the bolt head 4. Both the ramps 18 and the threading continue toward the bolt head 4 until the shank portion 16 having the anti-turn ears 12,14.

The threaded fastening portion 8, typically sized at 5/16"-18 or ¼"-20, is designed to receive a conventional cap nut and washer (not shown) to secure the toilet in place. Also conventional is at least one notch 20 in the threaded portion 8 at a point along its length, to facilitate removal of any excess length of the bolt 2 which may project above the aforementioned cap nut after tightening against the base of the toilet bowl. After any such excess length has been removed, the usual decorative nut cover is placed over the exposed nut and bolt to conceal the hardware.

Referring now to FIG. 2, improvements and advantages obtained in use of the novel closet bolt 2 will be more readily seen. A customary mounting flange 30 is secured to the floor 32 and extends down through a hole 34 in the floor 32. While the hole 34 is shown as having a diameter such that the floor 32 extends to an area 36 underneath the bolt head 4, it should be understood that the hole 34 may be larger so that the bolt 2 would freely fall out if not securely retained in place during positioning and installation of the toilet bowl 40 (shown in phantom).

In use, the bolt head 4 is inserted through an opening on the upper side of the flange 30 and the bolt 2 is slid along an arcuate slot 38 whose width is less than the narrowest dimension of the generally oval bolt head 4. While the bolt head 4 has been described as being generally oval in shape, it should be understood that any suitable shape may be used, so long as the head 4 slips into the conventional slot of a conventional mounting flange. Next, the bolt 2 is pulled upwardly by the user so that the head 4 firmly abuts an underside surface 31 of the flange 30.

Substantially simultaneously, a washer 60, preferably a spring washer, is placed on the ramped portion 10 so as to engage a pair of ramps 18 on opposite sides of the ramped portion 10. It should be apparent that the sawtooth ramps 18 should not extend laterally beyond the minor diameter of the threading, so as not to interfere with a conventional nut. The washer is preferably sufficiently resilient and is appropriately dimensioned so as to snap down over the ramps until the lowermost edges 62 of the washer 60 contact the flange 30. When so positioned, the closet bolt 2 is securely held in a vertical position as shown, and resists deflection from vertical, thus facilitating placement of the toilet bowl 40 over the customary two or more such bolts used to attach the bowl 40 to the floor 32.

Alternatively, because the threading 8 continues down the shank 6 even on the ramped portion 10, a securing nut (not shown), with or without an additional ordinary flat washer, may be placed on the bolt 2 before the bolt head 4 is placed in the arcuate slot 38. In this case, the nut may simply be tightened until the head 4 contacts the flange underside 31, thereby achieving the same result of firmly securing the bolt 2 in a vertically upright position.

Referring briefly to FIG. 3, a partial cross-sectional view taken along line 3—3 of FIG. 2 is shown. The spring washer 60 is seen to be in engagement with one of the plurality of ramps 18, thus holding the bolt head 4 up against the underside 31 of the flange 30. The threading 8 is seen to continue down the ramped portion 10 to the anti-turn ears 12,14. According to the invention, the ears 12,14 have an overall lateral dimension "A" which is greater than the width of the conventional arcuate slot 38 of the flange 30, but have a depth dimension "B" (FIG. 2) which is narrower than the slot 38. Accordingly, when the bolt 2 is placed in the slot 38 and secured as described previously, the anti-turn ears 12,14 will lodge against the sides of the slot 38 to completely prevent further rotation of the bolt 2, thus providing sure and certain tightening of the customary cap nut to secure the toilet bowl 40 in place. This is especially important in environments such as mobile trailer homes and recreational vehicles, where the floor is constantly subjected to frequently severe shock and vibration. While the oval heads of prior art bolts were intended to accomplish the same function by engaging the outer rim of the mounting flange, such results were not readily obtained.

Figure 6:
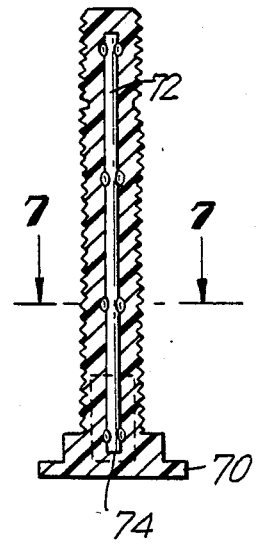
FIG. 6 is a sidecross-sectional view of a preferred embodiment of an improved closet bolt.
Figure 7:
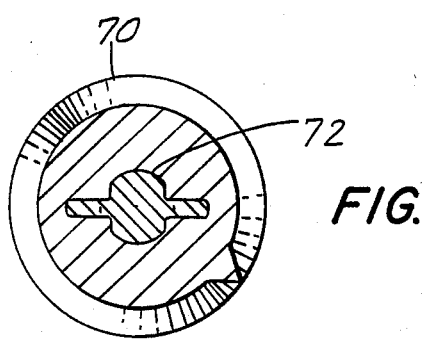
FIG. 7 is a cross-sectional vies of the bolt of FIG. 6 taken along line 7—7.

The closet bolt according to the invention may be made of cold-formed brass, as is customary. However, brass hardware used to mount toilets corrodes over long periods of time due to frequent wetting by bowl water, cleaning solutions and urine. Therefore, the preferred material for the invention is nylon or another suitable high-strength plastic. All parts, including the bolt, washer and cap nut, may be easily, rapidly and inexpensively molded by techniques notoriously well known in the plastics art. For additional strength, if desired, a barbed wire 72 may be molded in place along the longitudinal axis 74 of the plastic bolt 70, as shown in FIG. 6. The wire 72 is seen in cross-section in FIG. 7, taken along line 7—7 in FIG. 6.

Figure 5:
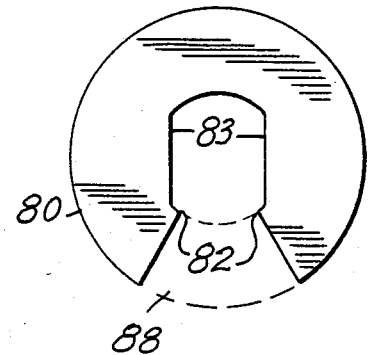
FIG. 5 is a plan view of a novel washer for use with an improved closet bolt according to the invention.

Referring now to FIGS. 4 and 5, details of special washers adapted for use with the closet bolt of the invention are shown. FIG. 4 is a cross-sectional view taken along line 4—4 of FIG. 2, wherein it is seen that the central opening 66 in the spring washer 60 has opposed arcuate portions 65 and opposed flat portions 67, the latter for snapping over and engaging the previously described ramps 18. An alternative form of washer is shown in FIG. 5, where an arcuate portion 88 of the washer 80 has been removed. This washer may quickly and easily be slipped horizontally directly onto the ramped portion of the closet bolt, and is retained in place by the slightly inwardly protruding portions 82 of the washer 80 which have a distance between them which is slightly less than the distance between ramp engaging surfaces 83 of the washer 80.

While the preferred material for the described washers is molded nylon or other high strength plastic, other usual materials such as fibre board, steel, and phosphor bronze may also be employed.

As has been fully illustrated and described, the invention provides a closet bolt which is non-corroding so that it can be removed after many years of service, which can be nutted securely to the flange if desired, which can be quickly and easily secured to the flange in an upright vertical position during toilet bowl installation, which cannot rotate when the cap nut is tightened, which is strong, and which is economical to manufacture.

Numerous variations and modifications, in addition to those already described, will be plain to those skilled in the art. For example, only one anti-turn ear may be employed. Also, the particular orientation of the ears with respect to bolt head shape (in the case of a substantially oval head) is not deemed critical, and thus the ears may align with the head minor axis or major axis or anything in between. These changes do not depart from the basic spirit of the invention.

I claim:

1. A closet bolt comprising:
    a head;
    a shank integral with the head including a first threaded fastening portion generally concentric with respect to the head; and
    anti-turn protrusions extending radially outwardly from a second portion of the shank between the first threaded fastening portion and the head,
    wherein the shank includes a ramped portion adjacent the shank second portion, the ramped portion having on opposite sides thereof a plurality of ramp members, said ramp members being inclined toward the bolt head.

2. A closet bolt comprising:
    a head;
    a shank integral with the head including a first threaded fastening portion generally concentric with respect to the head; and
    anti-turn protrusions extending radially outwardly from a second portion of the shank between the first threaded fastening portion and the head,
    wherein the shank includes a ramped portion adjacent the shank second portion, the ramped portion having on opposite sides thereof a plurality of ramp members, said ramp members being inclined toward the bolt head, and wherein the ramped portion is also threaded on its circumferential surfaces which are not ramped.

3. The bolt of claim 2, wherein the bolt is made of plastic.

4. The bolt of claim 3, wherein the plastic is molded nylon.

5. The bolt of claim 3, further comprising a reinforcing wire internal and generally longitudinal along the bolt axis.

6. For use in combination with a toilet bowl mounting flange having at least one arcuate slot in an outer portion thereof, apparatus comprising:
    a closet bolt comprising:
        a head;
        a shank integral with the head including a first threaded fastening portion generally concentric with respect to the head; and
        anti-turn protrusions extending radially outwardly from a second portion of the shank between the first threaded fastening portion and the head,
        wherein the shank includes a ramped portion adjacent the shank second portion, the ramped portion having on opposite sides thereof a plurality of ramp members, said ramp members being inclined toward the bolt head; and
    a washer having a central opening therethrough having first opposed inside edges and second opposed flat inside edges, the second opposed inside flat edges being adapted to resiliently snap over and engage the ramp members when the washer is moved longitudinally along the bolt shank toward the head.

7. The apparatus of claim 6, wherein the washer is a curved spring washer.

8. The apparatus of claim 6, wherein the washer is made of plastic.

9. The apparatus of claim 8, wherein the bolt is made of plastic.

10. The apparatus of claim 9, wherein the plastic is molded nylon.

11. The apparatus of claim 6, wherein the antiturn protrusions have an overall lateral dimension greater than the width of the arcuate slot of the mounting flange.

* * * * *